United States Patent [19]

Iwatsuki et al.

[11] Patent Number: 5,558,949
[45] Date of Patent: Sep. 24, 1996

[54] BATTERY BOX

[75] Inventors: Syuichiro Iwatsuki; Masami Fukagawa; Kei Oshida; Kazuyuki Mochizuki; Hiroyuki Fujimoto; Masayoshi Okamoto, all of Wako, Japan

[73] Assignee: Honda Giken Kogyo Kabushiki Kaisha, Tokyo, Japan

[21] Appl. No.: 364,610

[22] Filed: Dec. 27, 1994

[30] Foreign Application Priority Data

Dec. 27, 1993 [JP] Japan ................................. 5-348396
Oct. 17, 1994 [JP] Japan ................................. 6-251010

[51] Int. Cl.⁶ ............................................... H01M 2/10
[52] U.S. Cl. ................................... 429/99; 429/100
[58] Field of Search ........................... 429/96–100, 176, 429/163; 180/68.5

[56] References Cited

U.S. PATENT DOCUMENTS

| | | | |
|---|---|---|---|
| 1,266,780 | 5/1918 | Edison | 429/62 |
| 3,837,918 | 9/1974 | Nakabayashi | 429/62 X |
| 3,846,178 | 11/1974 | Evjen et al. | 429/96 X |
| 4,169,191 | 9/1979 | Alt et al. | 429/99 |
| 4,883,725 | 11/1989 | Gerard | 180/68.5 X |
| 5,390,754 | 2/1995 | Masuyama et al. | 180/68.5 |
| 5,392,873 | 2/1995 | Mauyama et al. | 180/68.5 |

FOREIGN PATENT DOCUMENTS

| | | |
|---|---|---|
| 1459178 | 10/1966 | France . |
| 0943132 | 5/1956 | Germany . |
| 5193367 | 8/1993 | Japan . |

*Primary Examiner*—Anthony Skapars
*Attorney, Agent, or Firm*—Lyon & Lyon

[57] ABSTRACT

A battery box has a center frame extending between two rows of batteries housed in the battery box. The center frame has an array of upwardly projecting locking pins. A central holder bar is installed on the locking pins of the center frame. The battery box also has an inner frame including a left straight frame with locking pins and a right straight frame with locking pins. A left holder bar and a right holder bar are installed respectively on the locking pins of the left straight frame and the right straight frame. The central, left, and right holder bars are fastened in position by nuts that are tightened over the locking pins, thereby holding the batteries firmly in the battery box.

19 Claims, 21 Drawing Sheets

BATTERY BOX

BACKGROUND OF THE INVENTION

1. Field of the Invention

The present invention relates to a battery box, and more particularly to a battery holder structure for use in a battery box to hold individual batteries securely in the battery box.

2. Description of the Related Art

Vehicles propelled by electric motors, typically electric vehicles, are generally supplied with electric energy from batteries. Usually, a plurality of batteries are housed in a battery box which is installed on the vehicle body of an electric vehicle. Since batteries, e.g., lead storage batteries, are considerably heavy, battery boxes for use in electric vehicles to hold those batteries are required to be of a rugged structure.

One conventional battery box is shown in FIG. 1 of the accompanying drawings. The battery box, generally denoted by 1 in FIG. 1, houses a total of ten batteries 2 arranged in two horizontal rows, each of five batteries, which are gripped by a pair of respective horizontal straight bars 3a, 3b each having bent opposite ends. The straight bars 3a, 3b are fastened to the bottom panel of the battery box 1 by a plurality of vertical studs 4a, 4b that are fixed to the bottom panel by nuts (not shown), thereby positioning and holding the batteries 2 securely in the battery box 1. Fastening forces applied to the studs 4a, 4b are transmitted through the straight bars 3a, 3b to the individual batteries 2 to keep the batteries 2 against accidental displacement.

FIG. 2 of the accompanying drawings illustrates a conventional battery box assembly. As shown in FIG. 2, an inner cover 6 is placed over two horizontal rows of batteries 5 and covered with a lid 7. The lid 7 is fastened to a battery box 8 by bolts and nuts (not shown). The inner cover 6 has a plurality of spaced partitions 9 positioned therein which are inserted between adjacent ones of the batteries 5 to prevent the batteries 5 from being displaced in the directions of the rows of the batteries 5.

Japanese laid-open patent publication No. 5-193367 discloses an improved battery box for use in an electric vehicle. The disclosed battery box is made of steel, and has an open top and a closed bottom on which there is mounted a reinforcing frame composed of parallel crossing members.

The improved battery box disclosed in the above publication still has some problems to be solved, as described below.

The first problem is addressed to the rigidity of the battery box. The equations (1), (2), given below, are used to calculate a maximum flexure and a maximum bending stress of a flat plate at its center when subjected to a uniformly distributed load while the flat plate is being supported at four corners thereof(see Manual of Mechanical Engineering, 6th edition, Chapter 4: Material dynamics, Table 37).

$$\text{Maximum flexure } \delta\text{max} = \alpha \frac{pa^4}{Eh^3} \quad (1)$$

where

α: a maximum flexure coefficient determined based on the ratio of a shorter side "a" and a longer side "b" (if b/a=2, then α=0.11);

p: the uniformly distributed load;

a: the length of the shorter side

E: Young's modulus; and h: the thickness of the flat plate.

$$\text{Maximum bending stress } \delta\text{max} = \beta \frac{pa^2}{h^2} \quad (2)$$

where

β: a maximum stress coefficient determined based on the ratio of the shorter side "a" and the longer side "b" (if b/a=2, then β=0.6);

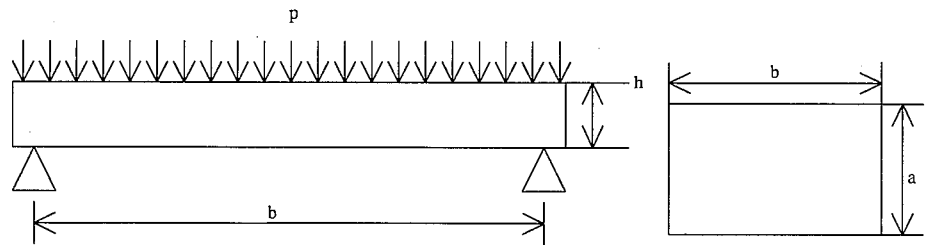

According to the equation (1), the maximum flexure is proportional to the fourth power of the length of the shorter side "a" and inversely proportional to the cube of the thickness "h" of the flat plate. The length of the shorter side "a" is not of a numerical value that can easily be varied because it is determined by the number and dimensions of batteries housed. To keep the flexure within an allowable flexure range, the thickness of the bottom panel of the battery box may be increased or the thickness of the reinforcing frame may be increased.

The reinforcing frame disclosed in the above publication has a small height in its cross section, and hence has a small geometrical moment of inertia and a small modulus of section in the direction of its height. Thus, the reinforcing frame has low bending rigidity and flexural rigidity against downward loads.

As a consequence, the battery box with the reinforcing frame requires that the thickness of the bottom panel thereof and also the thickness of the reinforcing frame be increased. The resultant battery box is disadvantageous in that it is heavy.

The second problem is concerned with processes of manufacturing the battery box. The battery box disclosed in the above publication is manufactured by either a build-up process for welding four side plates to a bottom panel or a drawing process for drawing a flat plate. The build-up process is highly costly and does not lend itself to mass production. The drawing process needs an expensive drawing die, and requires corners made up of bottom and side plates to be rounded. Consequently, the drawing process fails to produce sharp corners on the battery box, which is necessarily large in size.

The third problem is directed to thermal insulation of the battery box. As disclosed in the above publication, the conventional battery box has battery cooling fans, i.e., a forced-draft fan and an induced-draft fan, for cooling the batteries only.

It has been found that the heat of the batteries includes a heat flow radiated from the batteries outwardly through the box walls and a heat flow supplied from an external source inwardly through the box walls to the batteries, and that these heat flows are responsible for temperature differences between the batteries, adversely affecting the performance and service life of the batteries.

The conventional batteries 2 shown in FIG. 1, which are typically lead storage batteries, have vertical dimensions which differ from each other within a few millimeters. Therefore, the straight bars 3a, 3b are not effective to fasten those of the batteries 2 which are not tall enough to be held in contact with the straight bars 3a, 3b. While the electric vehicle is running, those shorter batteries 2 tend to be displaced into collision with adjacent batteries 2.

Even though the inner cover 6 and the partitions 9 are added as shown in FIG. 2, the batteries 5 are not accurately positioned because the lid 7 and the battery box 8 are directly fastened to each other. Furthermore, since the rows of batteries 5 are slightly spaced from each other, they tend to move and become damaged while the electric vehicle is running.

SUMMARY OF THE INVENTION

It is an object of the present invention to provide a battery box which is highly rigid, can be manufactured at a reasonable cost, is of a simple structure, and is highly thermally insulative.

Another object of the present invention is to provide a battery box which can fix individual batteries sufficiently with pressing forces even if the batteries have different heights, for securely holding the batteries against accidental movement in the battery box.

Still another object of the present invention is to provide a battery box which is highly simple in structure and inexpensive to manufacture.

According to the present invention, there is provided a battery box for housing at least two rows of batteries, comprising a center frame to be disposed vertically between the two rows of batteries for holding the batteries in position.

The center frame may comprise a hollow member having a substantially inverted U-shaped cross section.

The center frame should preferably have a height which is substantially the same as the height of the batteries.

The battery box should preferably further comprise an outer box bent from a flat plate into a bottomed box shape, and an inner frame formed from a flat plate and fixed to inner surfaces of front, rear, left, and right walls of the outer box, the center frame being disposed in the inner frame.

The battery box may further comprise thermally insulating members associated with a bottom panel of the outer box, the front, rear, left, and right walls of the inner frame, and the center frame.

The center frame may have a plurality of locking pins, and may further comprise holder means for holding the batteries, the holder means comprising central holding means for engaging the locking pins and holding adjacent inner ends of the batteries in the two rows, first end holding means for holding outer ends of the batteries in one of the two rows, and second end holding means for holding outer ends of the batteries in the other of the two rows.

The battery box should preferably further comprise first end frame and a second end frame which are disposed one on each side of the center frame, the first end frame and the second end frame having a first array of locking pins and a second array of locking pins, respectively, the first end holding means having means for engaging the first array of locking pins and holding the outer ends of the batteries in said one of the two rows, and the second end holding means having means for engaging the second array of locking pins and holding the outer ends of the batteries in the other of the two rows.

Preferably, the locking pins should be vertically disposed on the center frame, and the central holding means should comprise a holder bar having a plurality of holes for receiving the locking pins of the center frame, and a plurality of elastic members for being pressed against the adjacent inner ends of the batteries in the two rows.

The elastic members may comprise respective rubber strips mounted on the holder bar.

Alternatively, the elastic members may comprise a pair of legs of metal each having a plurality of slits defined therein at spaced intervals in a longitudinal direction thereof.

The locking pins may be vertically disposed on the center frame, and the central holding means may comprise a pair of swing plates engaging the locking pins for holding the adjacent inner ends of the batteries in the two rows.

The central holding means may comprise a central holder, the swing plates being swingably supported on the central holder by a hinge mechanism.

The central holder may have a pair of tongues on respective opposite ends thereof for engaging the batteries to prevent the central holder from being turned when the central holder is fastened to the locking pins.

The above and other objects, features, and advantages of the present invention will become apparent from the following description when taken in conjunction with the accompanying drawings which illustrate preferred embodiments of the present invention by way of example.

DETAILED DESCRIPTION OF THE PREFERRED EMBODIMENTS

Figure 1:
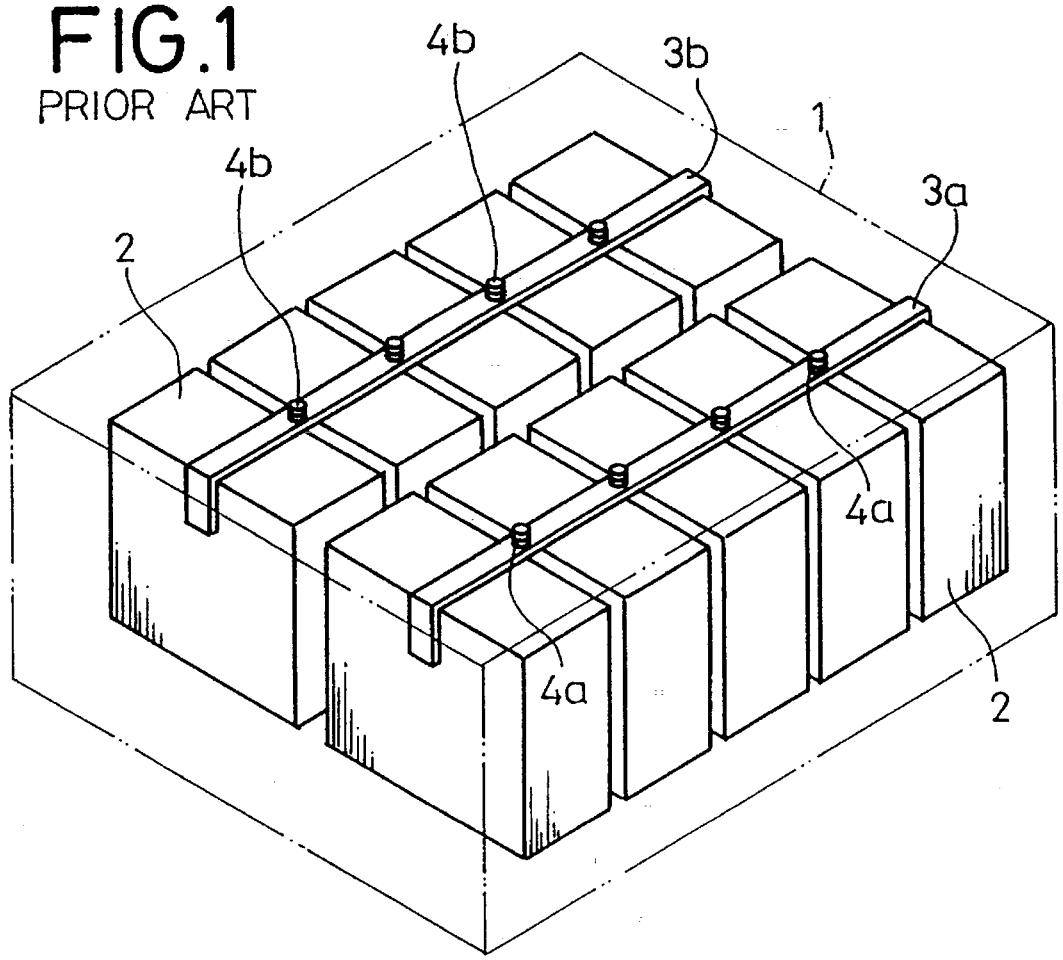
FIG. 1 is a perspective view of a conventional battery box.
Figure 2:
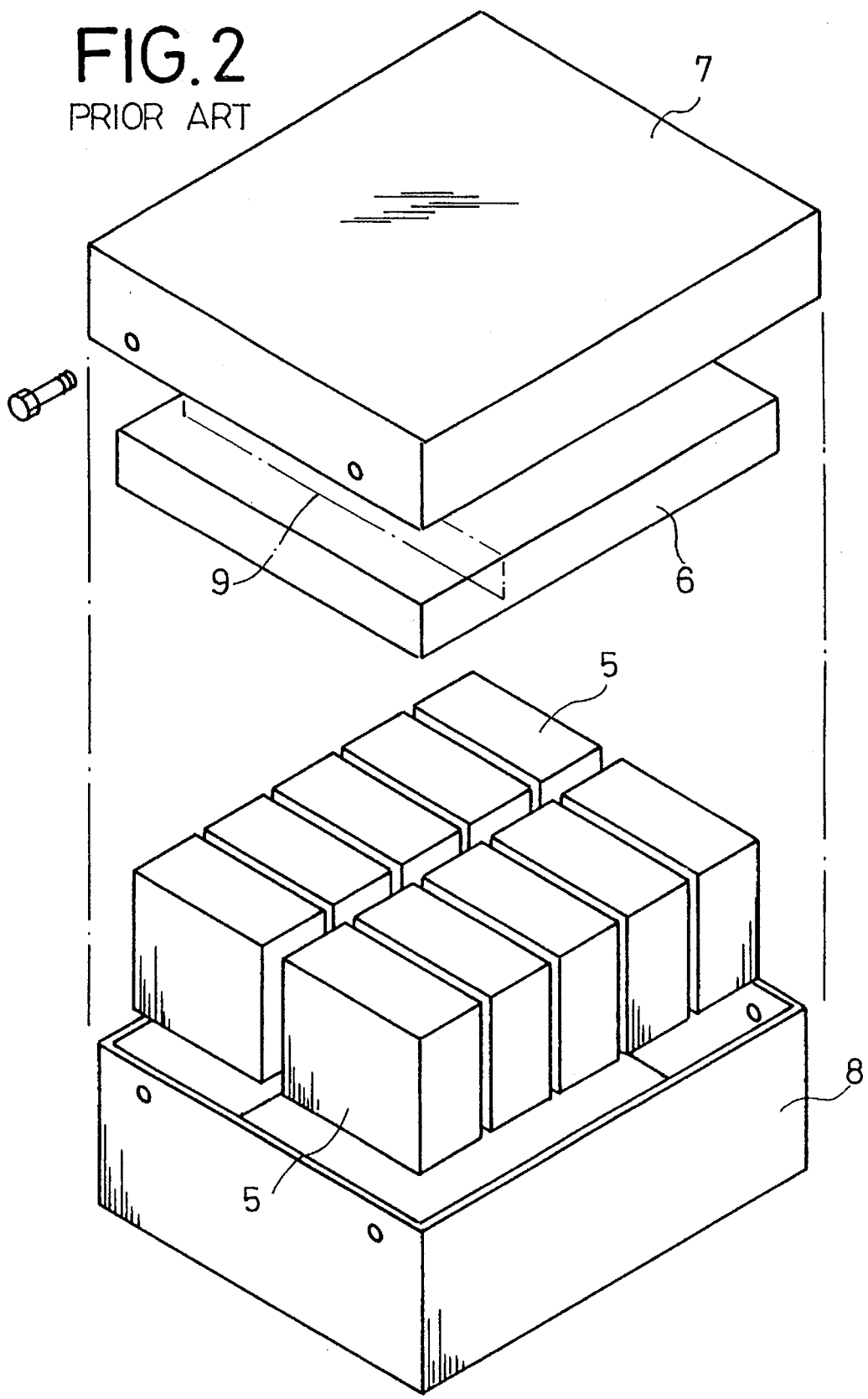
FIG. 2 is an exploded perspective view of another conventional battery box.
Figure 3:
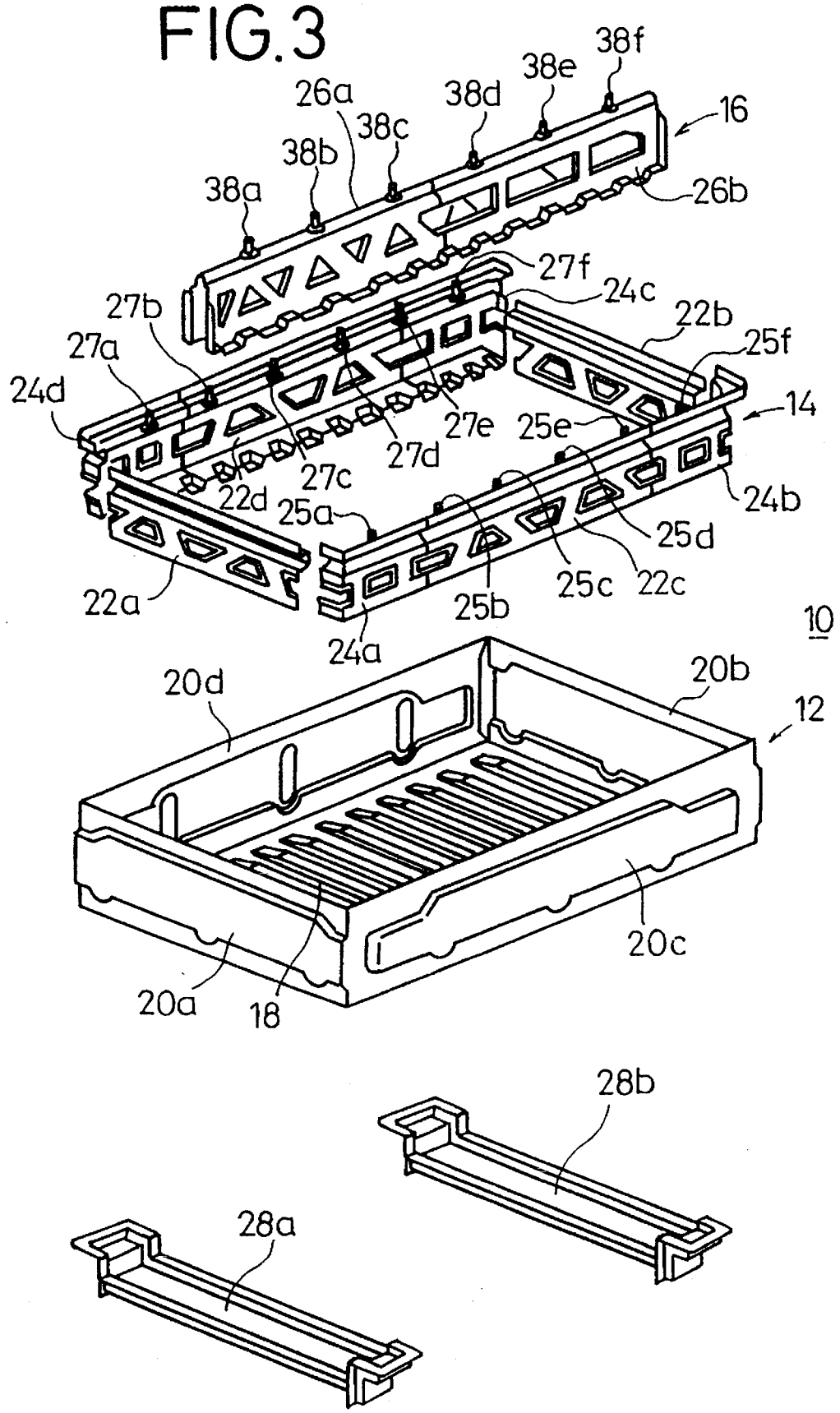
FIG. 3 is an exploded perspective view of a battery box according to an embodiment of the present invention.

As shown in FIG. 3, a battery box 10 according to an embodiment of the present invention basically comprises an outer box 12, an inner frame 14, and a center frame 16.

The outer box 12 essentially comprises a bottom panel 18, a front wall 20a, a rear wall 20b, a left wall 20c, and a right wall 20d. The inner frame 14, which is in the form of a rectangular frame, comprises a front straight frame 22a, a rear straight frame 22b, a left straight frame 22c, a right straight frame 22d, and corner frames 24a–24d joining adjacent ends of the straight frames 22a–22d. The corner frame 24a, the left straight frame 22c, and the corner frame 24b jointly have a plurality of equally spaced locking pins 25a–25f projecting upwardly from their upper edges, and the corner frame 24d, the right straight frame 22d, and the corner frame 24c jointly have a plurality of equally spaced locking pins 27a–27f projecting upwardly from their upper edges. The front, rear, left, and right straight frames 22a–22d are identical in shape to each other. Therefore, the cost of dies for manufacturing the parts of battery box 10 is reduced, and the number of different parts of the battery box 10 is also reduced.

Figure 4:
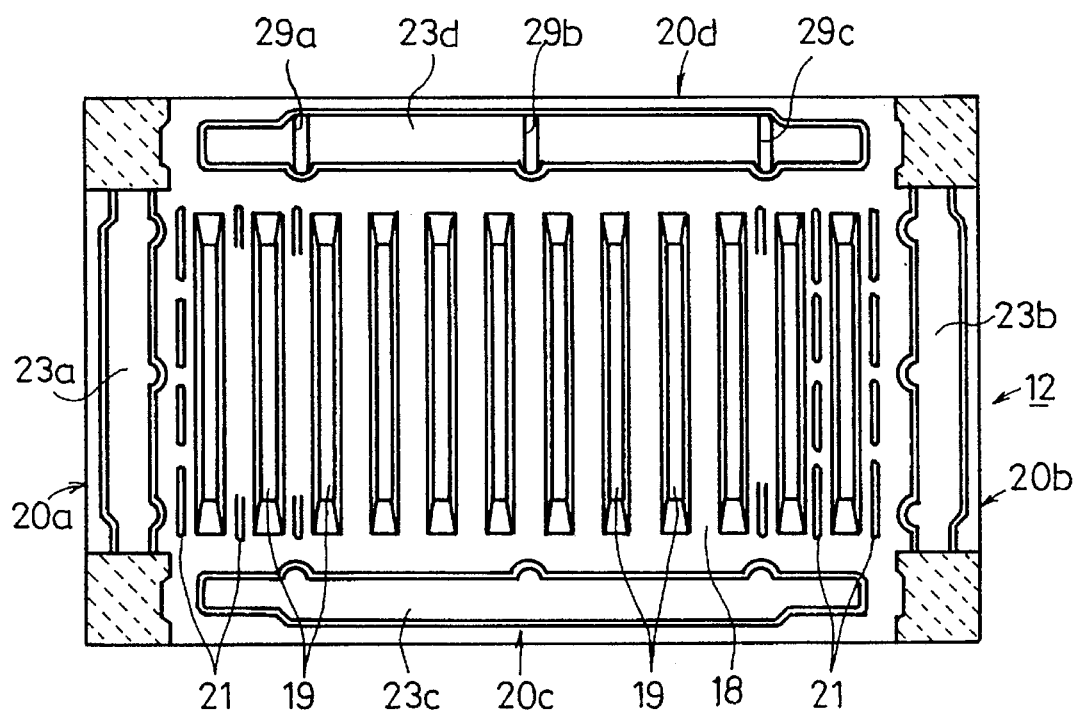
FIG. 4 is a developed plan view of an outer box of the battery box shown in FIG. 3.
Figure 5:
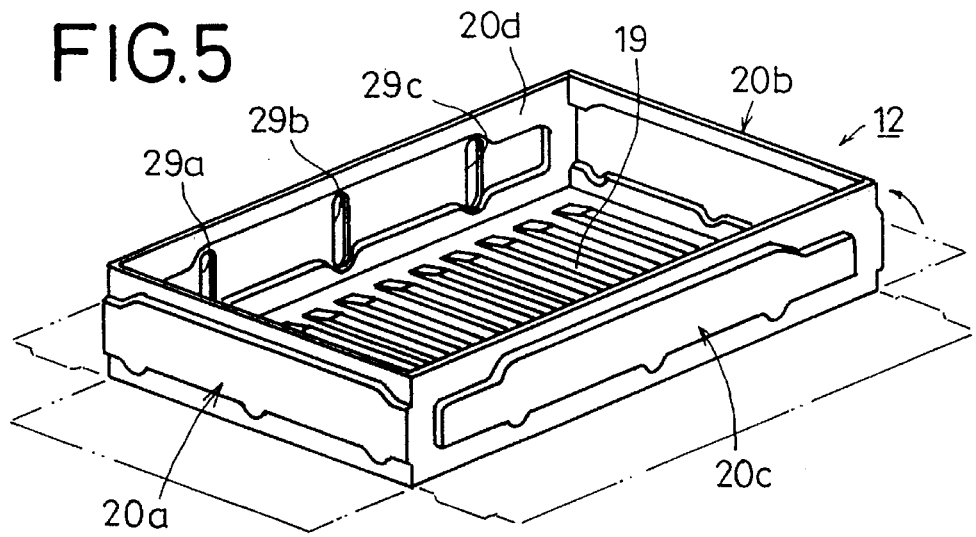
FIG. 5 is a perspective view of the outer box, with bent walls, shown in FIG. 4.

The outer box 12 will be described in detail below with reference to FIGS. 4 and 5. As shown in FIG. 4, the bottom panel 18 has a plurality of upwardly projecting beads or ridges 19 embossed for increased mechanical strength and a plurality of air suction slits 21 defined therein between the beads 19. The front, rear, left, and right walls 20a–20d have respective outwardly embossed lands 23a–23d, the land 23d having three air discharge holes 29a–29c defined therein as by punching. Four corners, shown hatched, are cut off from a blank of the outer box 12. As shown in FIG. 5, the front, rear, left, and right walls 20a–20d are bent upwardly into erected positions, and then welded to each other. The outer box 12 can thus be manufactured simply without the need for expensive and complex dies.

The center frame 16 comprises two half frames 26a, 26b (see FIG. 3). The straight frames 22a–22d and the corner frames 24a–24d are assembled together and then fixed together by spot welding or the like. The completed battery box 10 is fixed to a vehicle frame of an electric vehicle, for example, by a pair of support frames 28a, 28b (see FIG. 3).

The center frame 16 will be described in detail below with reference to FIGS. 6 and 7.

Figure 6:
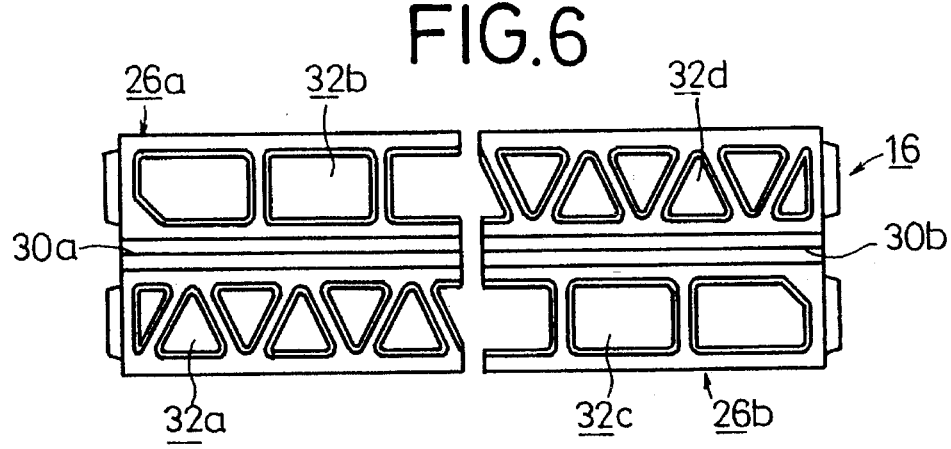
FIG. 6 is a developed plan view of a center frame of the battery box shown in FIG. 3.
Figure 7:
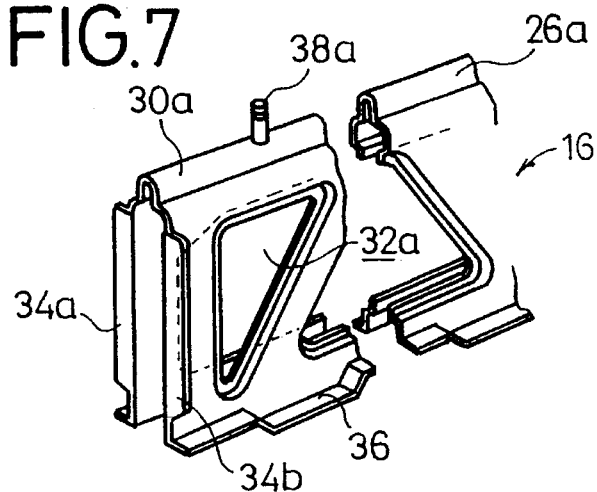
FIG. 7 is an enlarged fragmentary perspective view of the center frame shown in FIG. 6.

In FIG. 6, the half frame 26a of the center frame 16 has an array of triangular holes 32a defined as by punching in one side of a central fold 30a and an array of relatively large rectangular holes 32a defined as by punching in the opposite side of the central fold 30a. The half frame 26b of the center frame 16 has an array of relatively large rectangular holes 32c defined as by punching in one side of a central fold 30b and an array of triangular holes 32d defined as by punching in the opposite side of the central fold 30b. As can readily be seen from FIG. 6, the half frame 26b is of a shape which is turned 180° from the half frame 26a, and hence the half frames 26a, 26b are in point symmetry with each other. Consequently, the half frames 26a, 26b can be formed by using one die. The half frames 26a, 26b are folded over on themselves about the respective folds 30a, 30b, and then welded end to end, thereby completing the center frame 16. As shown in FIG. 7, the center frame 16 is of a hollow structure of an inverted U-shaped cross section, and has a height which is substantially the same as the height of batteries to be housed in the battery box 10.

The half frame 26a has a pair of flanges 34a, 34b extending from its free end in respective directions away from each other, and also has a pair of flanges 36 extending from its lower edges in respective directions away from each other. The flanges 34a, 34b are joined as by welding to the front straight frame 22a of the inner frame 14 shown in FIG. 3, and the flanges 36 are joined as by welding to the bottom panel 18 of the outer box 12. The half frame 26b also has flanges corresponding to the flanges 34a, 34b, 36 of the half frame 26a.

The center frame 16 has a plurality of equally spaced locking pins 38a–38f projecting upwardly from the upper edge thereof, i.e., the folds 30a, 30b. Preferably, the locking pins 38a–38f are fixed to the center frame 16 as by spot welding.

Figure 8:
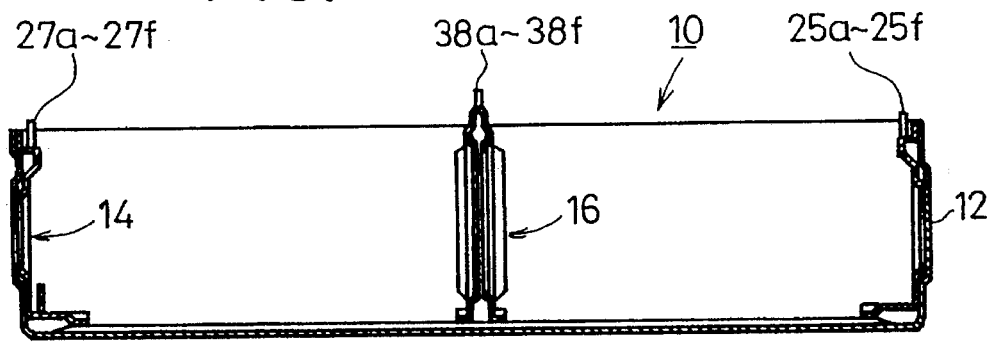
FIG. 8 is a transverse cross-sectional view of the battery box shown in FIG. 3.
Figure 9:
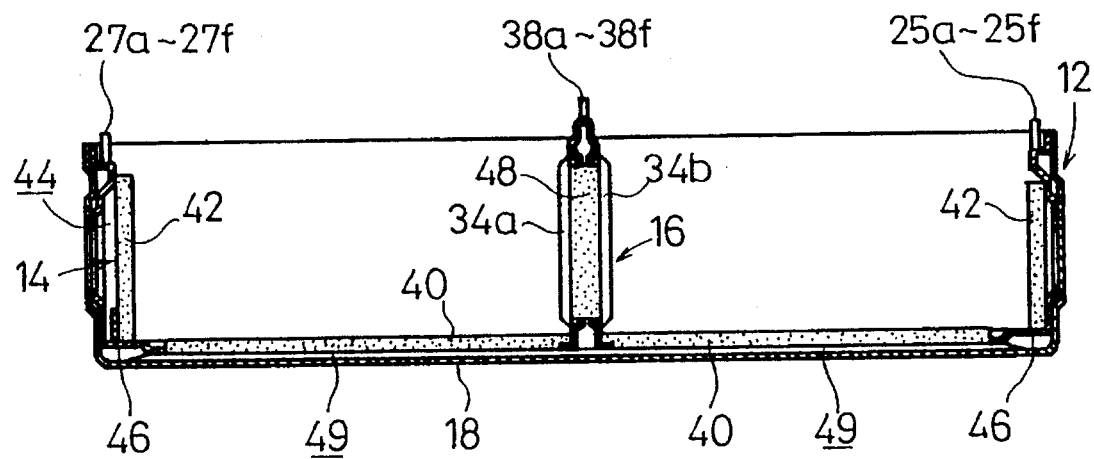
FIG. 9 is a transverse cross-sectional view of the battery box shown in FIG. 8, with thermally insulating members installed therein.

FIG. 8 shows in transverse cross section the battery box 10 with the center frame 16 fixed to the inner frame 14 which is placed in the outer box 12. FIG. 9 shows in transverse cross section the battery box 10 shown in FIG. 8 with thermally insulating members installed therein.

As shown in FIG. 9, lower thermally insulating members 40 are placed on the upper surface of the bottom panel 18, and left and right side thermally insulating members 42 are attached to inner surfaces of the inner frame 14, with an air discharge passage 44 defined between the left side thermally insulating member 42 and the inner frame 14. The inner frame 14 has raised portions 46 to which ends of the side thermally insulating members 42 are attached.

A central thermally insulating member 48 is filled in the center frame 16. Specifically, the central thermally insulating member 48 is forced into the center frame 16 through the holes 32a–32d, and then the holes 32a–32d are closed by suitable covers. Now, the outer box 12 is thermally insulated at its bottom panel and side walls, and the inner frame 14 is thermally insulated at its center. As shown in FIG. 9, slits 49 are defined between the bottom panel 18 and the lower insulating members 40, each of the slits 49 having a width of several millimeters corresponding to a gap between adjacent batteries. The slits 49 serve as a passage for supplying cooling air to the batteries.

A battery holder structural body is incorporated in the battery box 10 which includes the center frame 16.

Figure 10:
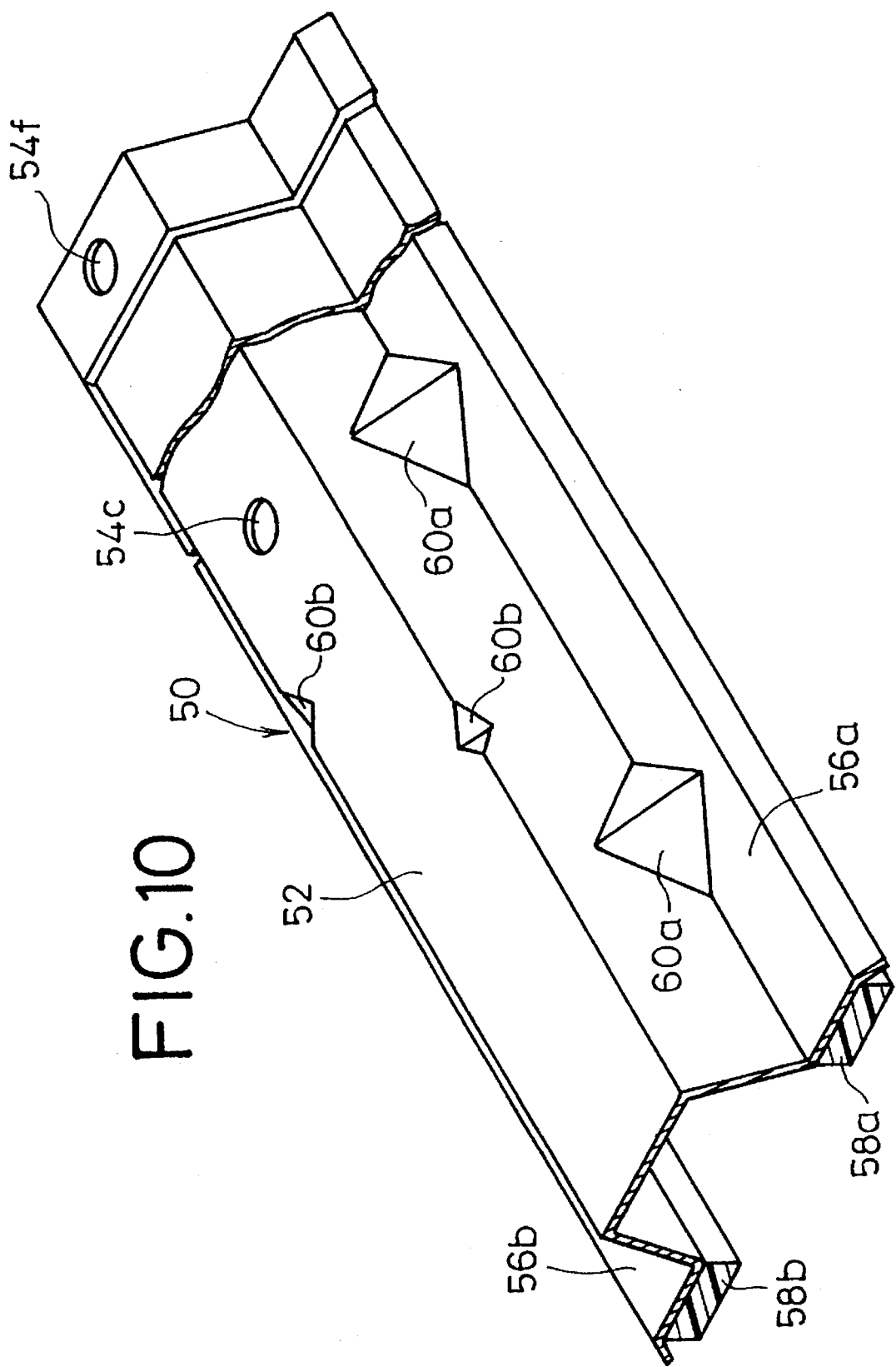
FIG. 10 is an enlarged fragmentary perspective view of a central holder bar of a battery holder structural body to be incorporated in the battery box.
Figure 11:
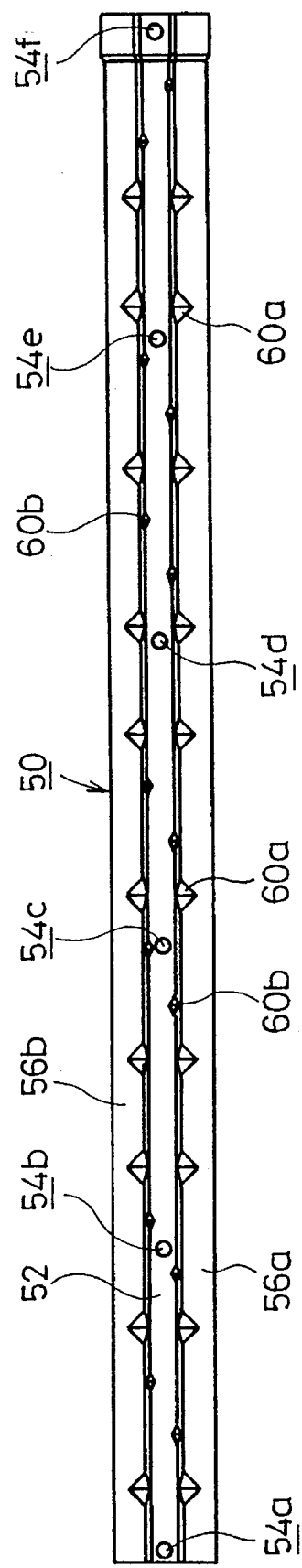
FIG. 11 is a plan view of the central holder bar shown in FIG. 10.

FIGS. 10 and 11 show a battery holder structural body in the form of a straight bar. As shown in FIG. 11, the battery holder structural body includes a resilient central holder bar 50 of metal having substantially the same length as the length of the center frame 16 and a plurality of spaced holes 54a–54f defined therein in alignment with the respective locking pins 38a–38f of the center frame 16. As shown in FIG. 10, the central holder bar 50 has a central region 52 bulging upwardly and a pair of legs 56a, 56b extending transversely from opposite sides of the central region 52 in respective directions away from each other. The holes 54a–54f are defined in the central region 52. Elastic strips 58a, 58b of synthetic rubber each having a thickness of about 8 mm, for example, are bonded to the respective lower surfaces of the legs 56a, 56b by an adhesive. The central holder bar 50 also has a plurality of larger triangular convexities 60a and a plurality of smaller triangular concavities 60b arranged at equally spaced intervals along the axis of the central holder bar 50 for stiffening the legs 56a, 56b.

Figure 12:
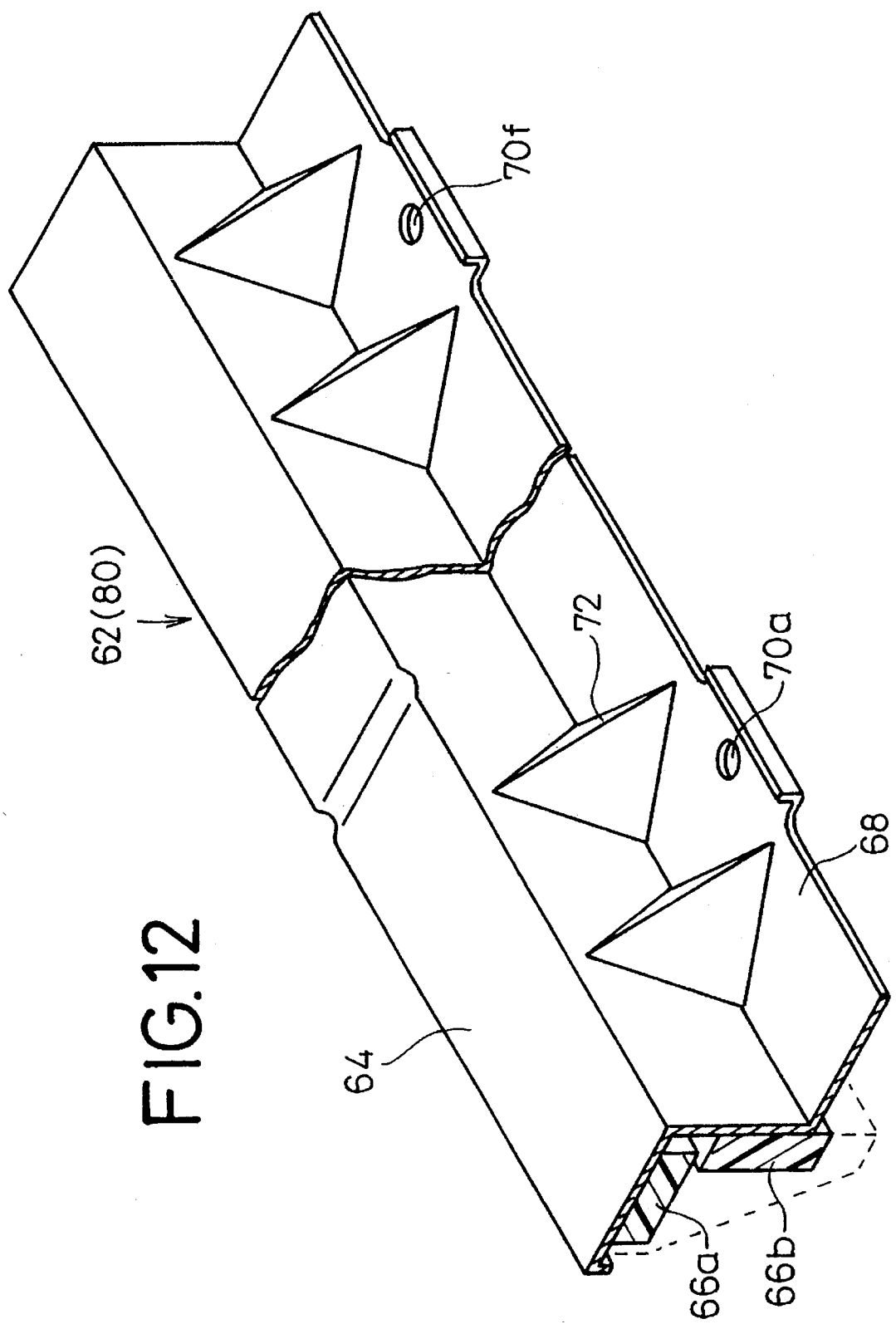
FIG. 12 is an enlarged fragmentary perspective view of a left holder bar of the battery holder structural body.
Figure 13:
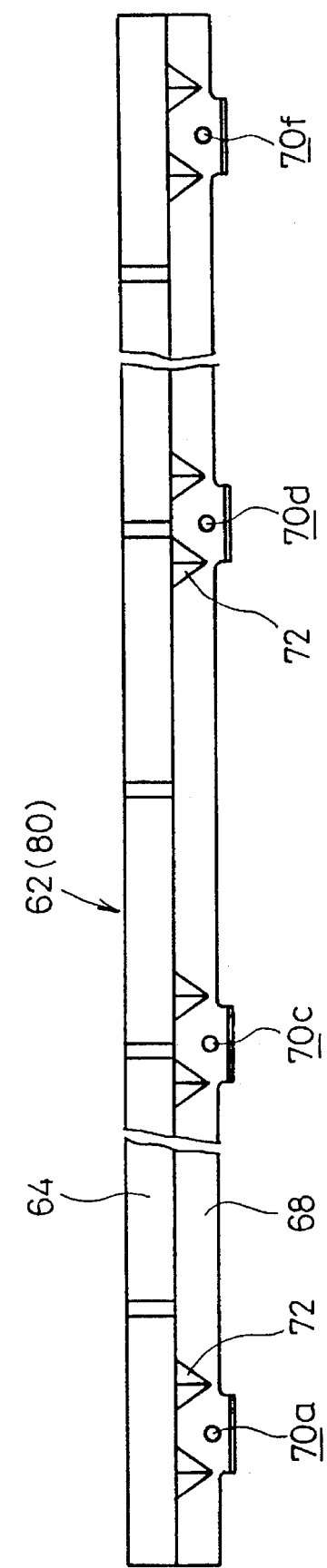
FIG. 13 is a fragmentary plan view of the left holder bar shown in FIG. 12.

FIGS. 12 and 13 show a left holder bar 62 of the battery holder structural body, for engagement with the locking pins 25a–25f of the left straight frame 22c of the inner frame 14. As shown in FIG. 12, the left holder bar 62 is in the form of a bent metal plate including a battery holder 64 and an engaging region 68. Elastic strips 66a, 66b of synthetic rubber are mounted in a right-angled configuration on lower and side surfaces of the battery holder 64. The engaging region 68 is bent and extends outwardly from the battery holder 64, and has a plurality of spaced holes 70a–70f for insertion of the locking pins 25a–25f therein. The left holder bar 62 has a plurality of triangular convexities 72 arranged at spaced intervals along the axis of the left holder bar 62 for stiffening the left holder bar 62.

A right holder bar 80 of the battery holder structural body, for engagement with the locking pins 27a–27f of the right straight frame 22d of the inner frame 14, is essentially identical to the left holder bar 62 except that they are of symmetrical shape, and hence will not be described in detail below.

Figure 14:
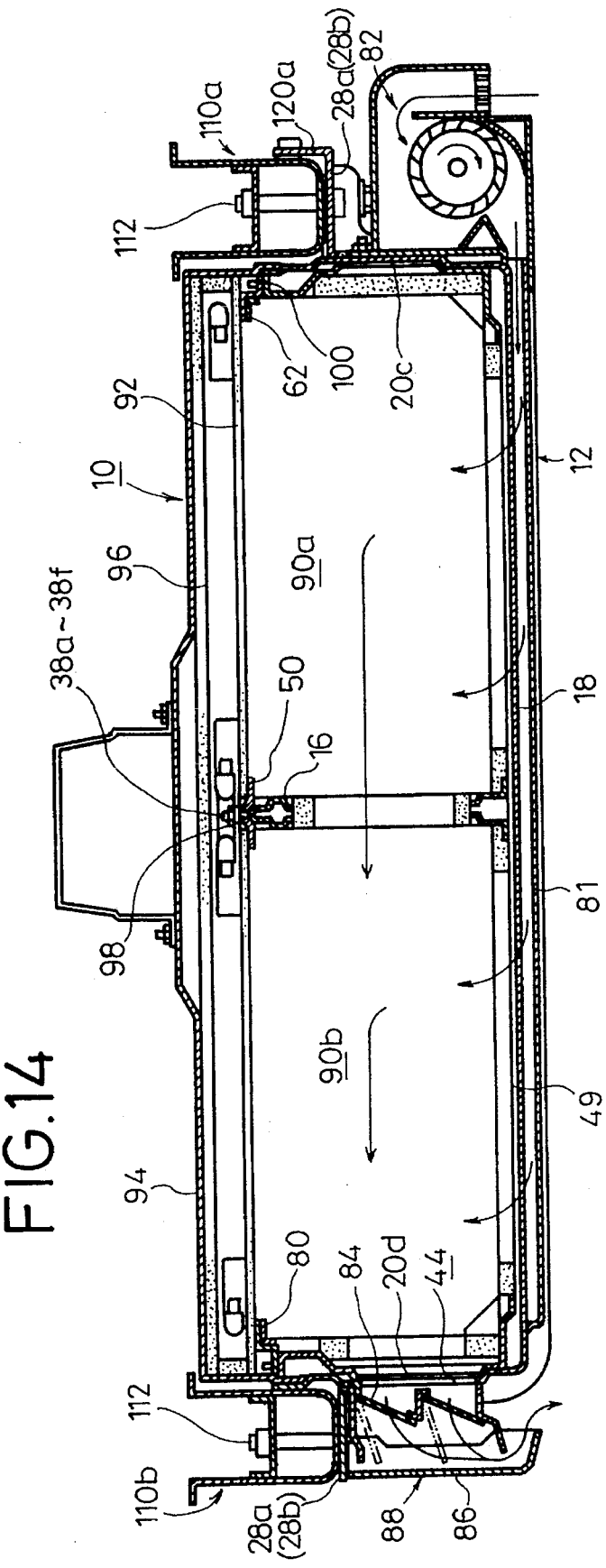
FIG. 14 is a transverse cross-sectional view of the battery box with the battery holder structural body installed thereon.

Batteries are fixedly housed in the battery box 10 using the central holder bar 50, the left holder bar 62, and the right holder bar 80 as follows:

FIG. 14 shows the assembled battery box 10 in cross section. An air duct 81 is mounted on the lower surface of the bottom panel 18 of the outer box 12, a cross-flow fan 82 on the left wall 20c, and an air discharge outlet 88 on the right wall 20d, the air discharge outlet 88 comprising air discharge fins or vanes 84 and a hood 86. Two rows of batteries 90a, 90b, typically lead storage batteries, are housed in respective compartments of the inner frame 14 which are divided by the center frame 16, and longitudinally held therein by the center frame 16. Web-shaped thermally insulating members 92, which double as gaskets, are positioned in gaps above the two rows of batteries 90a, 90b. The web-shaped thermally insulating members 92 are covered with a lid 94 with an upper thermally insulating member 96 interposed between the lid 94 and the web-shaped thermally insulating members 92.

The battery box 10 is assembled as follows: First, the locking pins 38a–38f of the center frame 16 are fitted respectively into the holes 54a–54f in the central holder bar 50, and nuts 98 are threaded and tightened over respective upper ends of the locking pins 38a–38f which are exposed above the central holder bar 50. The locking pins 25a–25f of the left straight frame 22c are then fitted respectively into the holes 70a–70f in the left holder bar 62, and nuts 100 are threaded and tightened over respective upper ends of the locking pins 25a–25f which are exposed above the left holder bar 62. Similarly, the locking pins 27a–27f of the right straight frame 22d are fitted respectively into the corresponding holes in the right holder bar 80, and nuts are threaded and tightened over respective upper ends of the locking pins 27a–27f which are exposed above the right holder bar 80.

When the nuts 98 are tightened against the central holder bar 50, adjacent inner ends of the batteries 90a, 90b are resiliently clamped by the elastic strips 58a, 58b bonded to the legs 56a, 56b of the central holder bar 50. When the nuts 100 are tightened against the left holder bar 62, outer corners of the batteries 90a are resiliently clamped by the elastic strips 66a, 66b, so that the batteries 90a are held in position against horizontal movement by the elastic strip 66b. Similarly, when the nuts are tightened against the right holder bar 80, outer corners of the batteries 90b are resiliently clamped by the elastic strips 66a, 66b, so that the batteries 90b are held in position against horizontal movement by the elastic strip 66b. Even if the batteries 90a, 90b have different heights, they are held securely in position by the elastic strips 58a, 58b bonded to the legs 56a, 56b of the central holder bar 50 and the elastic strips 66a of the left and right holder bars 62, 80. The batteries 90a, 90b are also maintained in position against horizontal movement by the elastic strips 66b of the left and right holder bars 62, 80. The battery box 10 thus assembled is fixed to vehicle frames 110a, 110b by the support frames 28a, 28b using a plurality of bolts 112.

When the batteries 90a, 90b are to be cooled while the electric vehicle is running, the cross-flow fan 82 is actuated. As shown in FIG. 14, the cross-flow fan 82 sends air under pressure into the air duct 81. The air that has flowed through the air duct 81 flows upwardly through the bottom panel 18 and the slits 49, and is applied to the batteries 90a, 90b. After having cooled front, rear, left, and right sides of the batteries 90a, 90b, the air flows horizontally into the air discharge passage 44, and then is discharged from the air discharge fins 84 and the hood 86 out of the air discharge outlet 88.

Inasmuch as the batteries 90a, 90b are firmly held in position by the elastic strips 58a, 58b, 66a, 66b on the central, left, and right holder bars 50, 62, 80, as described above, the batteries 90a, 90b are prevented from being displaced when the electric vehicle vibrates to a small or large extent while it is running. Since undesirable height differences between the batteries 90a, 90b are effectively absorbed by the elastic strips 58a, 58b, 66a, 66b, the batteries 90a, 90b are also prevented from being unduly deformed under excessive stresses. The central, left, and right holder bars 50, 62, 80 do not substantially increase the cost of the battery box 10 as the central, left, and right holder bars 50, 62, 80 can easily be pressed to shape.

Figure 15:
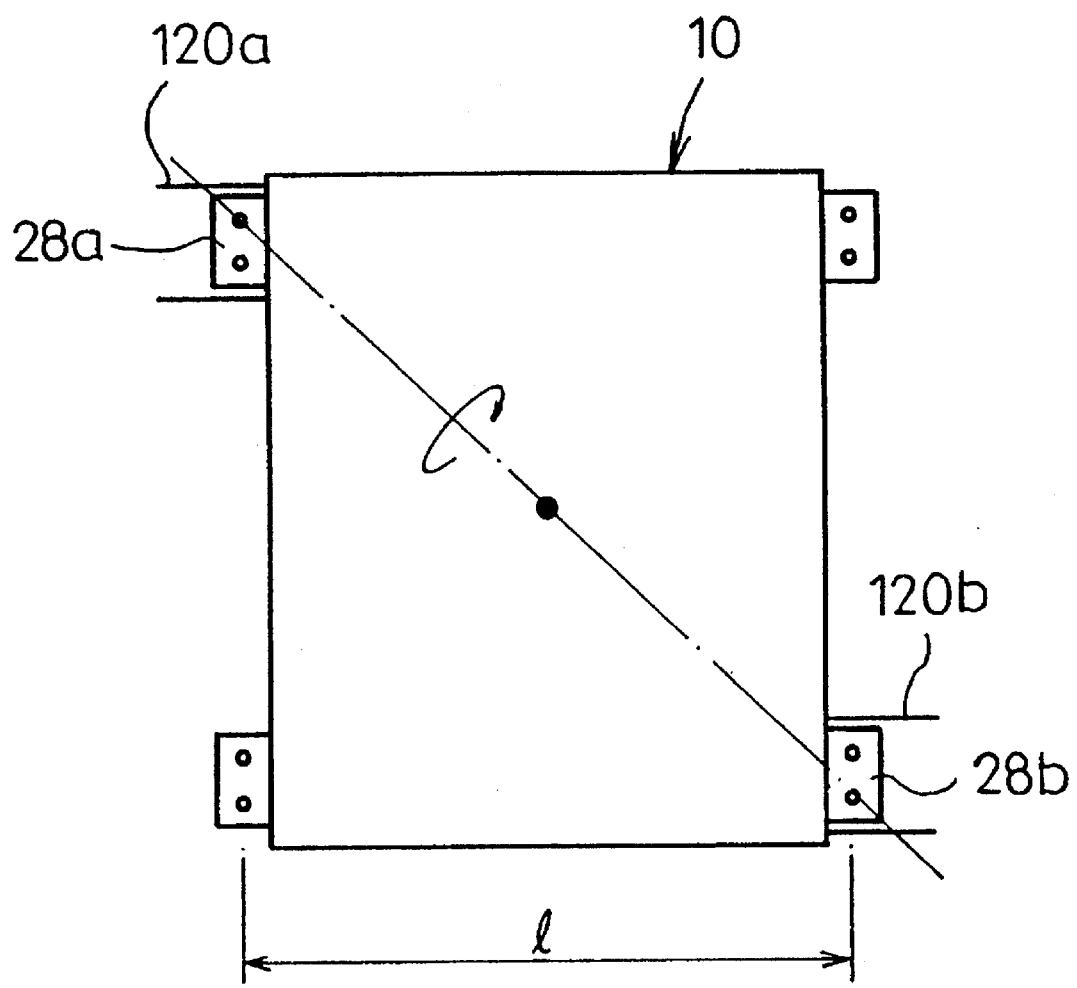
FIG. 15 is a plan view showing the positions of bolt holder stays for preventing bolts from being dislodged, in the battery box.

When a plurality of lead storage batteries are housed in the battery box 10, the combined weight thereof is very large. Therefore, the battery box 10 has to be firmly retained by the vehicle frames 110a, 110b. To prevent the bolts 112 from being dislodged, bolt holder stays 120a, 120b are attached on a diagonal line to the battery box 10 as shown in FIG. 15. Because of the diagonal arrangement of the bolt holder stays 120a, 120b, torques tending to force the battery box 10 off the vehicle frame are effectively canceled by the bolt holder stays 120a, 120b. Consequently, the bolt holder stays 120a, 120b may be of a smaller mechanical strength than conventional bolt holder stays, and may be of a relatively small size.

Figure 16:
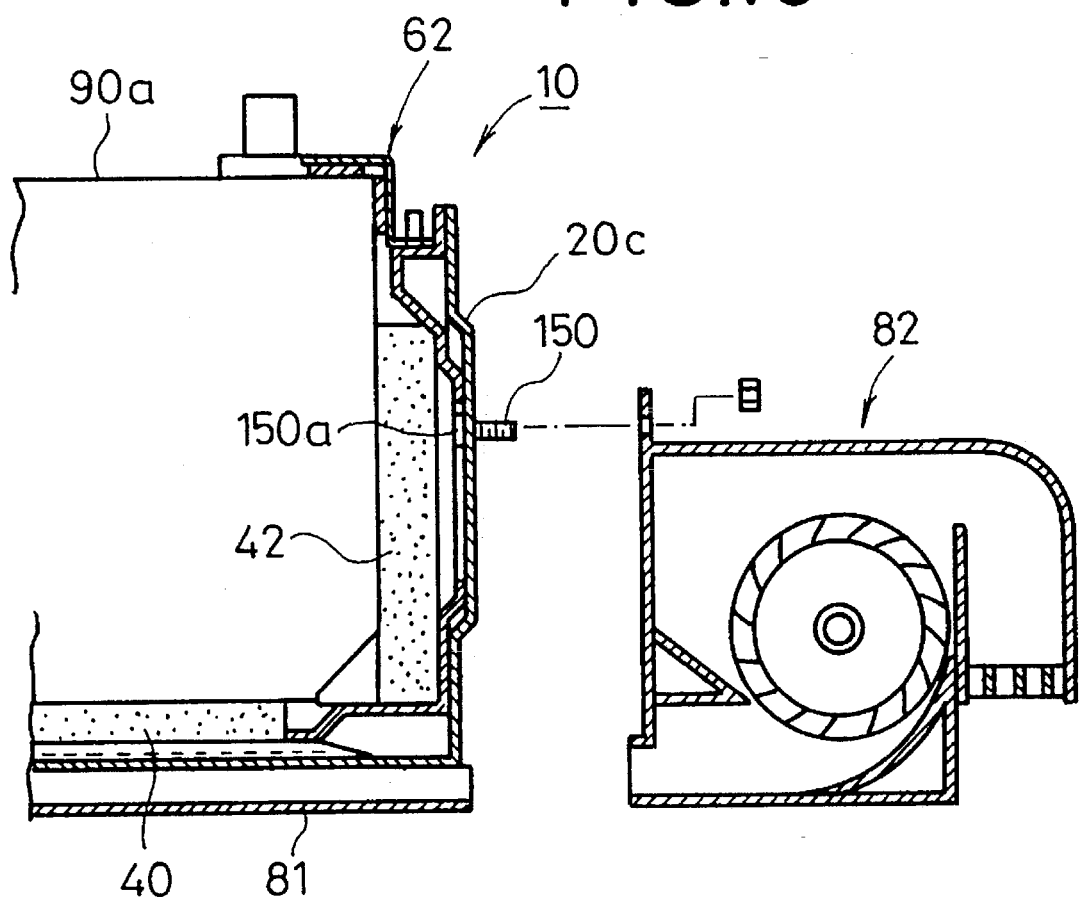
FIG. 16 is a fragmentary cross-sectional view showing the manner in which cross-flow fan of the battery box is installed in position.

FIG. 16 shows the manner in which the cross-flow fan 82 is installed in position on the battery box 10. The cross-flow fan 82 has a casing fastened to the left wall 20c of the outer box 12 by a bolt 150. The bolt 150 has a head 150a welded to the left wall 20c and a shank projecting outwardly through a flange of the casing of the cross-flow fan 82 and threaded into a nut. The air duct 81, a breaker box on the lid 94, and a hydrogen-explosion-proof filter may be installed on the battery box 10 in the same manner as shown in FIG. 16.

The structure shown in FIG. 16 is advantageous in that the batteries 90a, 90b are protected from damage by the tip end of the bolt 150.

Figure 17:
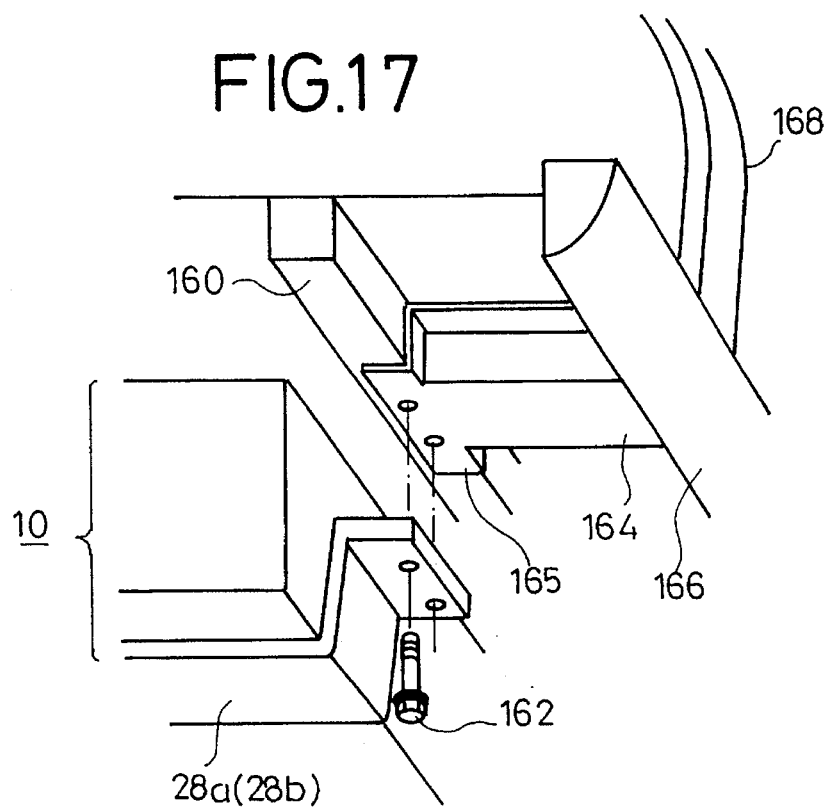
FIG. 17 is a fragmentary perspective view showing an arrangement by which the battery box is incorporated in a vehicle frame.

FIG. 17 shows an arrangement by which the battery box 10 is incorporated in a vehicle frame. As shown in FIG. 17, the support frames 28a, 28b of the battery box 10 are fastened to a floor frame 160 by bolts 162. The load of the battery box 10 is now transmitted through the floor frame 160 and an outrigger 164 to a side sill 166 and a center pillar 168. In this case, one end portion 165 of the outrigger 164 is in plain shape and fixed to the floor frame 160 with bolts 162.

Figure 18:
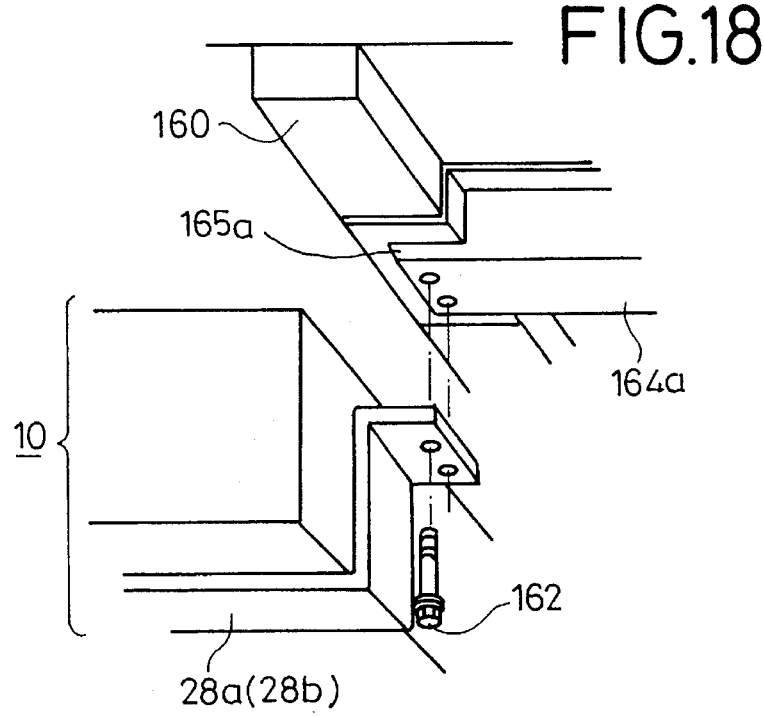
FIG. 18 is a fragmentary perspective view of a modification of the arrangement shown in FIG. 17.

FIG. 18 shows a modification of the arrangement shown in FIG. 17. In FIG. 18, the support frames 28a, 28b are fastened directly to the outrigger 164 by the bolts 162. The modified arrangement shown in FIG. 18 is advantageous in that the load of the battery box 10 is transmitted directly to the outrigger 164. In this configuration, the end portion 165a of the outrigger 164a is a box shape in cross-section rather than plain shape so that the rigidity is increased from that shown in FIG. 17.

Figure 19:
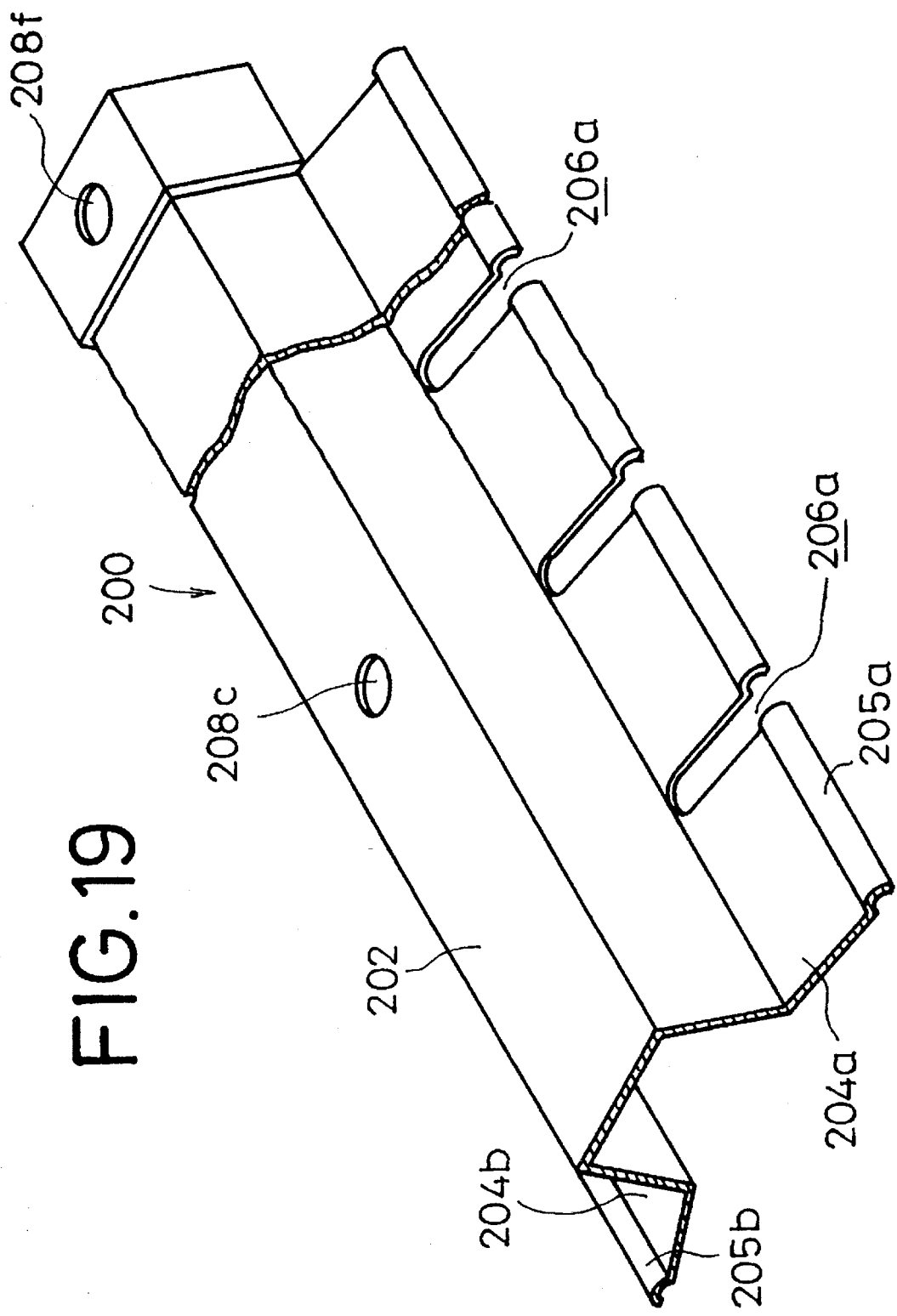
FIG. 19 is an enlarged fragmentary perspective view of a central holder bar of a battery holder structural body according to another embodiment of the present invention.
Figure 20:
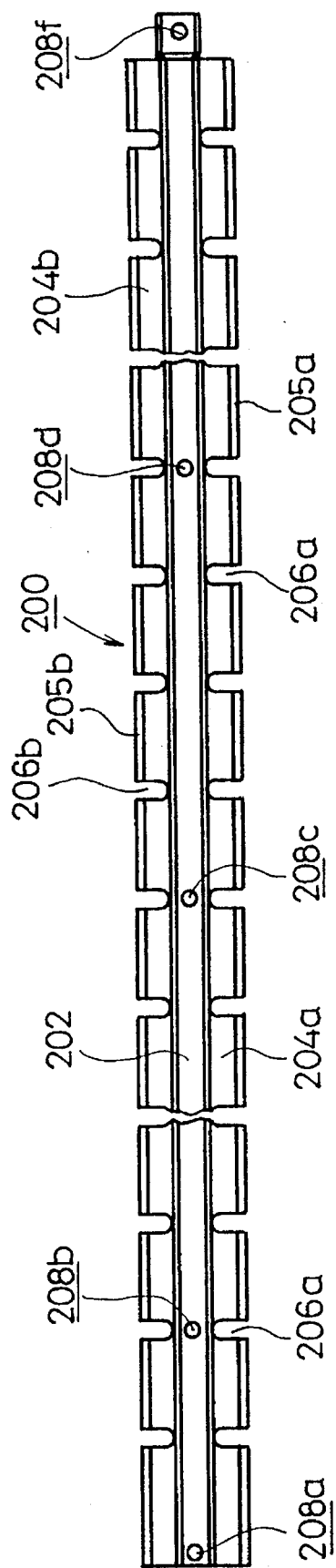
FIG. 20 is a plan view of the central holder bar shown in FIG. 19.
Figure 21:
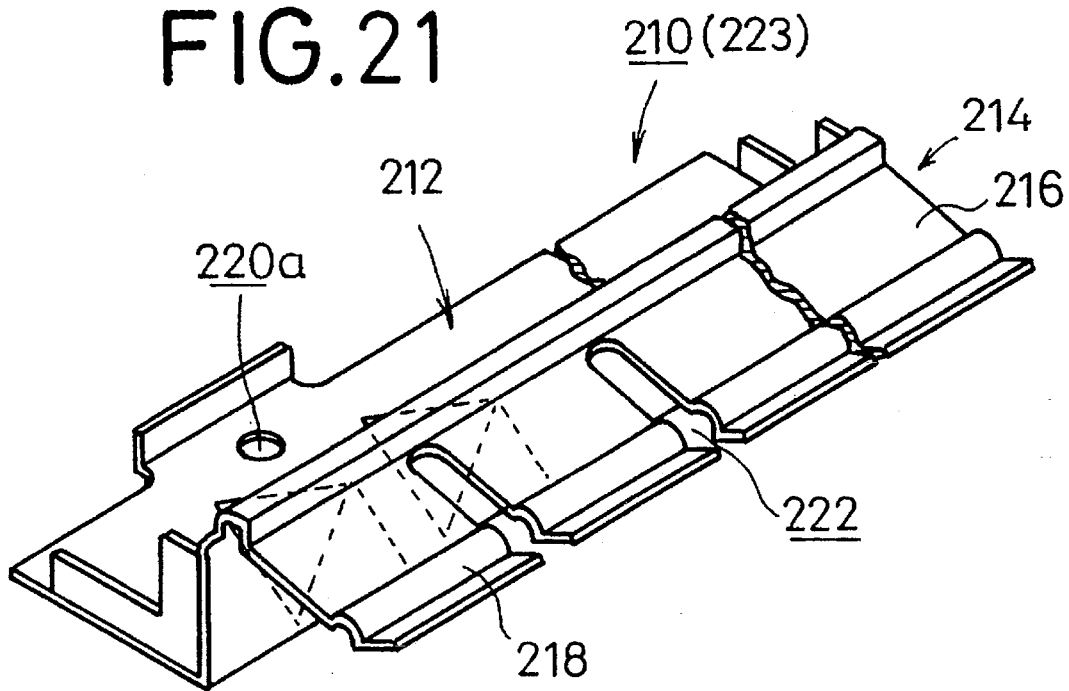
FIG. 21 is an enlarged fragmentary perspective view of a left holder bar of the battery holder structural body according to the other embodiment of the present invention.
Figure 22:
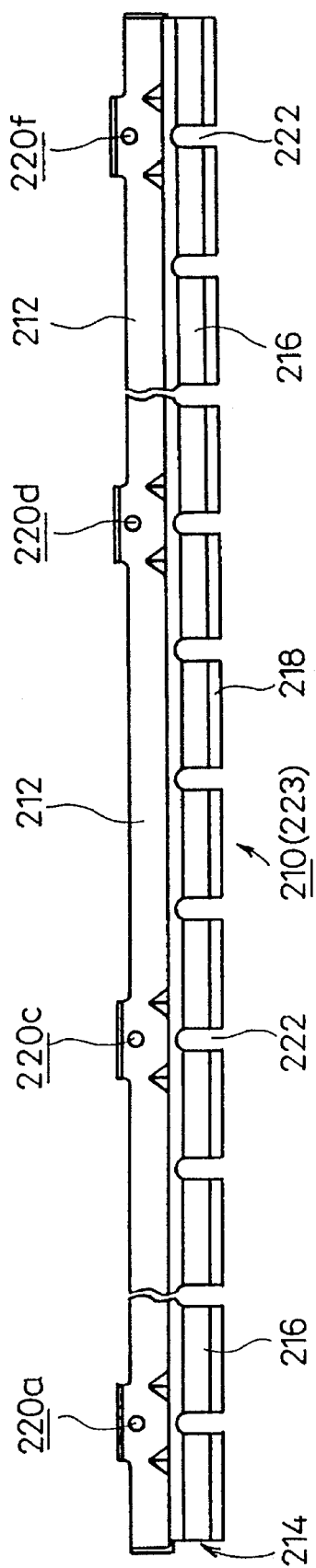
FIG. 22 is a plan view of the left holder bar shown in FIG. 21.

FIGS. 19 and 20 show a central holder bar 200 of a battery holder structural body according to another embodiment of the present invention. FIGS. 21 and 22 show a left holder bar 210 of the battery holder structural body according to the other embodiment of the present invention. In this embodiment, the central, left, and right holder bars have elastic portions themselves, rather than the elastic members 58a, 58b, 66a, 66b in the preceding embodiment.

In FIGS. 19 and 20, the central holder bar 200 has a central region 202 bulging upwardly and a pair of legs 204a, 204b extending transversely from opposite sides of the central region 202 in respective directions away from each other. The legs 204a, 204b have curved outer ends 205a, 205b, respectively. The leg 204a has a plurality of transverse slits 206a defined therein at equally spaced intervals in its longitudinal direction, and the leg 204b also has a plurality of transverse slits 206b defined therein at equally spaced intervals in its longitudinal direction. The central region 202 has a plurality of spaced holes 208a~208f (only 208c, 208f are shown in FIG. 19) defined therein in alignment with the respective locking pins 38a~38f of the center frame 16.

The left holder bar 210 shown in FIGS. 21 and 22 is arranged for engagement with the locking pins 25a~25f of the left straight frame 22c of the inner frame 14. As shown in FIG. 21, the left holder bar 210 has a horizontal engaging region 212 and a battery holder 214 extending vertically upwardly from the engaging region 212 and then horizontally away from the engaging region 212. The battery holder 214 has a leg 216 extending slightly obliquely downwardly and having a curved tip end 218. The engaging region 212 has a plurality of spaced holes 220a~220f for insertion of the locking pins 25a~25f therein. The leg 216 has a plurality of transverse slits 222 defined therein at equally spaced intervals which are the same as the intervals between the slits 206a, 206b in the central holder bar 200.

A right holder bar 223 of the battery holder structural body, for engagement with the locking pins 27a~27f of the right straight frame 22d of the inner frame 14, is essentially identical to the left holder bar 210 except that they are of symmetrical shape, and hence will not be described in detail below.

Using the battery holder structural body shown in FIGS. 19 through 22, the battery box 10 is assembled as follows: First, the locking pins 38a~38f of the center frame 16 are fitted respectively into the holes 208a~208f in the central holder bar 200, and nuts 98 are threaded and tightened over respective upper ends of the locking pins 38a~38f which are exposed above the central holder bar 200. The locking pins 25a~25f of the left straight frame 22c are then fitted respectively into the holes 220a~220f in the left holder bar 210, and nuts 100 are threaded and tightened over respective upper ends of the locking pins 25a~25f which are exposed above the left holder bar 210. Similarly, the locking pins 27a~27f of the right straight frame 22d are fitted respectively into the corresponding holes in the right holder bar 223, and nuts are threaded and tightened over respective upper ends of the locking pins 27a~27f which are exposed above the right holder bar 223. As a result, the legs 204a, 204b which are made resilient by the slits 206a, 206b elastically clamp adjacent inner ends of the batteries 90a, 90b, and the legs 216 of the left and right holder bars 210, 223 which are made resilient by the slits 222 elastically clamp outer ends of the batteries 90a, 90b.

The battery holder structural body shown in FIGS. 19 through 22 is less costly to manufacture because it does not employ the elastic members 58a, 58b, 66a, 66b in the preceding embodiment.

Figure 23:
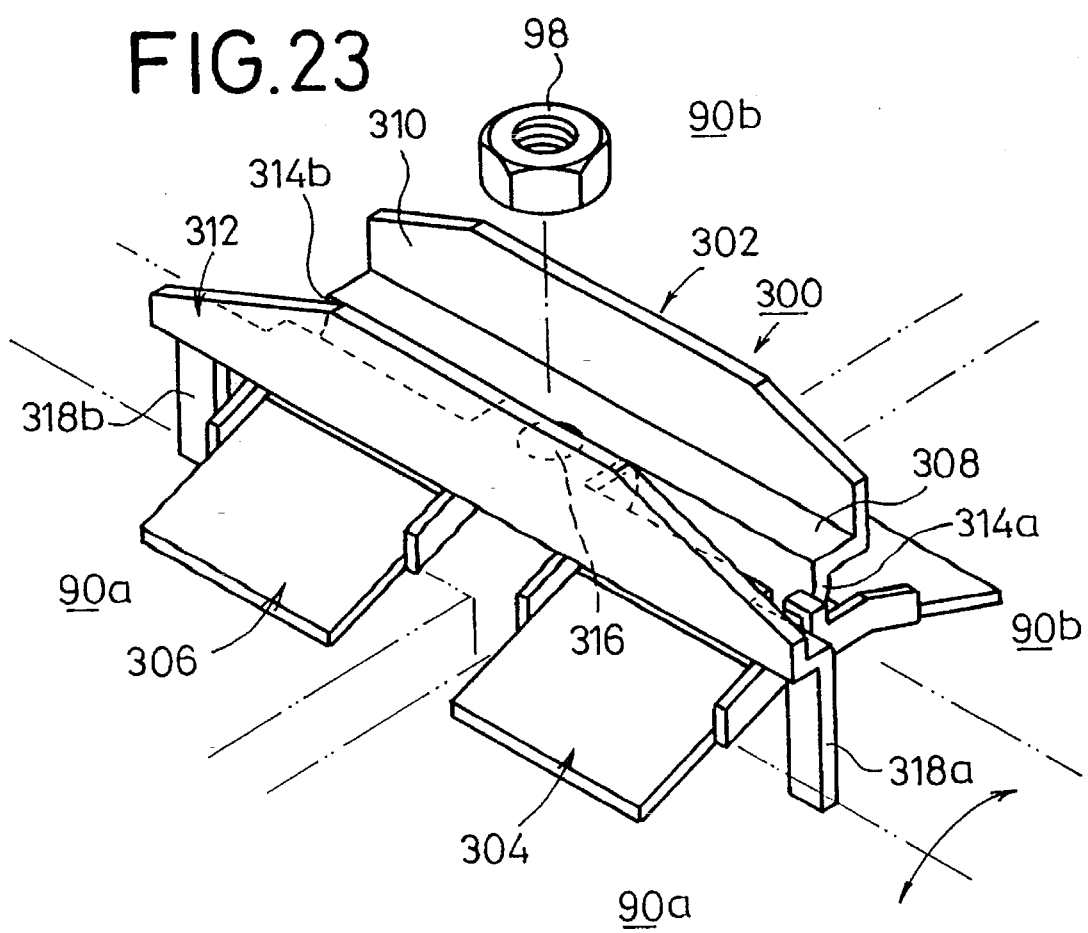
FIG. 23 is an enlarged perspective view of a battery holder structural body according to still another embodiment of the present invention.
Figure 24:
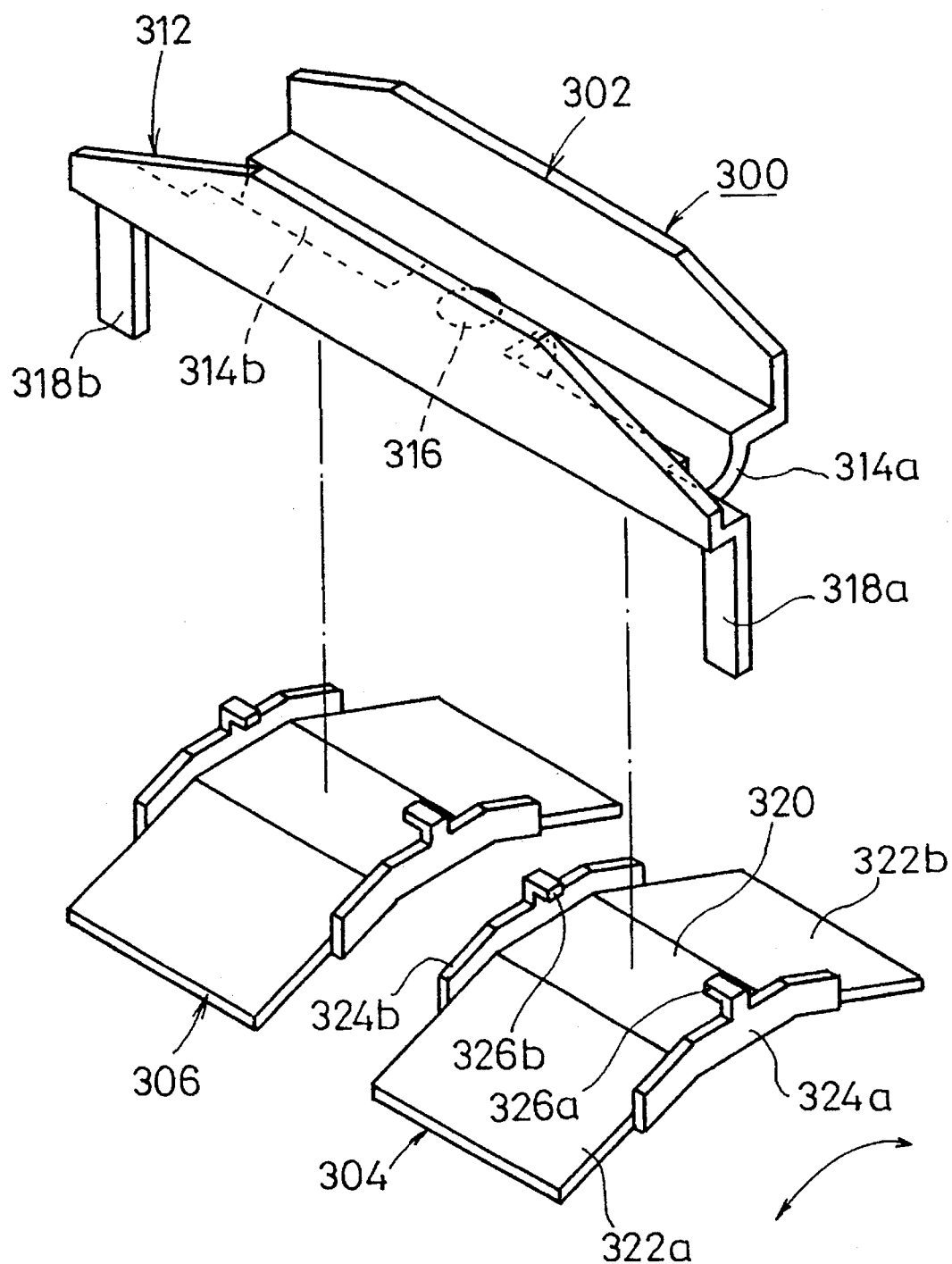
FIG. 24 is an exploded perspective view of the battery holder structural body shown in FIG. 23.

FIGS. 23 and 24 show a battery holder structural body 300 according to still another embodiment of the present invention. In this embodiment, a hinge mechanism is used to hold adjacent inner ends of the batteries 90a, 90b while absorbing height differences between the batteries 90a, 90b.

As shown in FIGS. 23 and 24, the battery holder structural body 300 basically comprises a central holder 302, a first swing plate 304, and a second swing plate 306, the first and second swing plates 304, 306 being hinged on the central holder 302. The central holder 302 comprises a horizontal region 308, a first vertical wall 310 integrally extending along an edge of the horizontal region 308, and a second vertical wall 312 slightly longer than and integrally extending along an opposite edge of the horizontal region 308 parallel to the first vertical wall 310. The horizontal region 308 has a first longitudinal downwardly curved portion 314a and a second longitudinal downwardly curved portion 314b which are aligned with and spaced from each other by a horizontal portion that has a hole 316 for insertion therein of any one of the locking pins 38a~38f of the center frame 16.

The second vertical wall 312 has a pair of first and second tongues 318a, 318b extending downwardly from respective opposite ends thereof.

As shown in FIG. 24, the first swing plate 304 has a horizontal region 320 and a pair of slanted wings 322a, 322b extending away from each other from the horizontal region 320 and inclined downwardly away from each other. The first swing plate 304 also has a pair of vertical flanges 324a, 324b disposed on opposite ends thereof and integrally extending along respective parallel opposite edges of the horizontal region 320 and the slanted wings 322a, 322b. The vertical flanges 324a, 324b have respective tongues 326a, 326b extending horizontally toward each other in overhanging relation to the horizontal region 320. The tongues 326a, 326b are held in engagement with the bottom surfaces of the respective opposite ends of the curved portion 314a. The second swing plate 306 is of a structure identical to the first swing plate 304, and will not be described in detail below. Therefore, the first and second swing plates 304, 306 are swingable in the directions indicated by the arrows in FIG. 24 about the tongues 326a, 326b that engage the bottom surfaces of the respective opposite ends of the curved portions 314a, 314b.

Batteries 90a, 90b are securely held in place by the battery holder structural body 300 as follows: The hole 316 of the battery holder structural body 300 is fitted over one of the locking pins 38a ~38f of the center frame 16, and a nut 98 is threaded over the locking pin. The first swing plate 304 is now placed over adjacent inner ends of batteries 90a, 90b, bridging the gap along the center frame 16 therebetween. Since the first swing plate 304 is swingable about the first curved portion 314a, it can absorb a height difference between the batteries 90a, 90b and securely hold the batteries 90a, 90b in position. Outer ends of the batteries 90a, 90b may be firmly fixed in position by the left and right holder bars of the previous embodiments. When the nut 98 is tightened over the locking pin, it tends to turn the battery holder structural body 300 about the locking pin. However, the battery holder structural body 300 is prevented from being turned by the tongues 318a, 318b which are held against adjacent side walls of the batteries 90a, 90b.

The battery holder structural body 300 with the above hinge mechanism is effective to secure batteries of difference heights more firmly than the battery holder structure bodies according to the previous embodiments.

Figure 25:
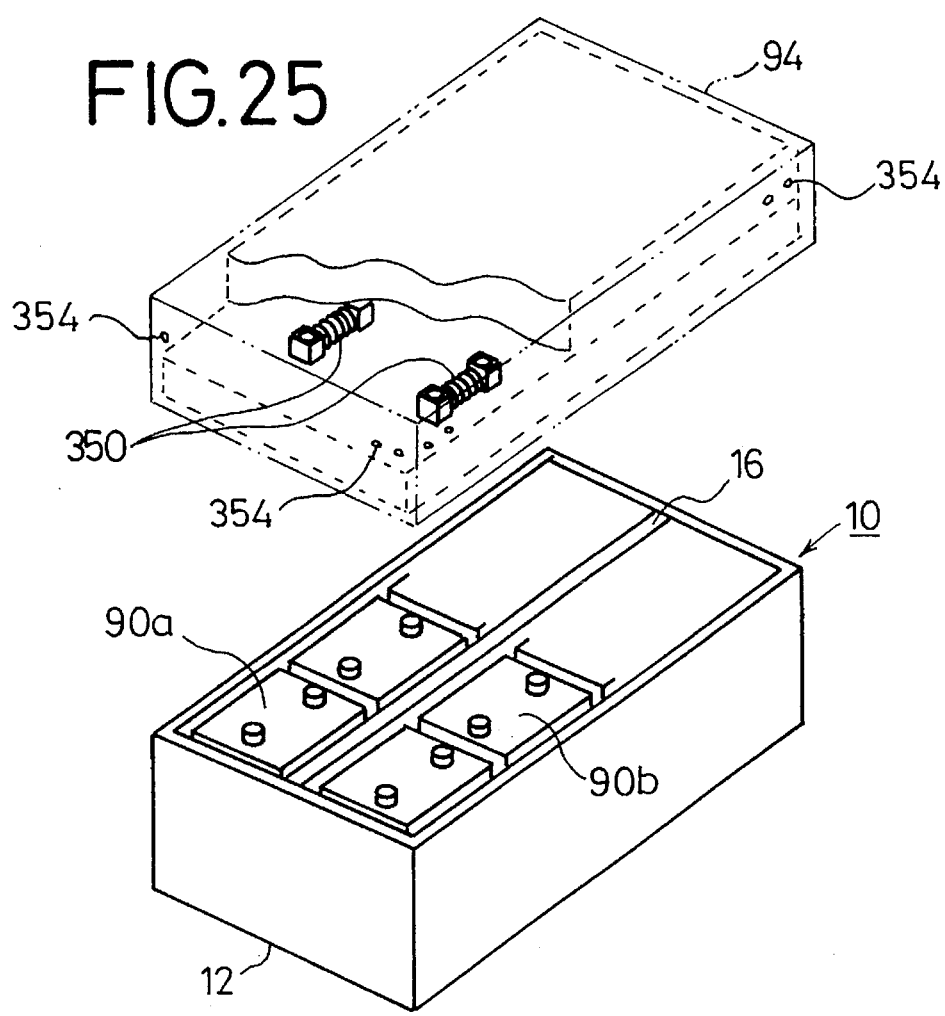
FIG. 25 is a perspective view showing the relationship between a lid and batteries in the battery box according to the present invention.
Figure 26:
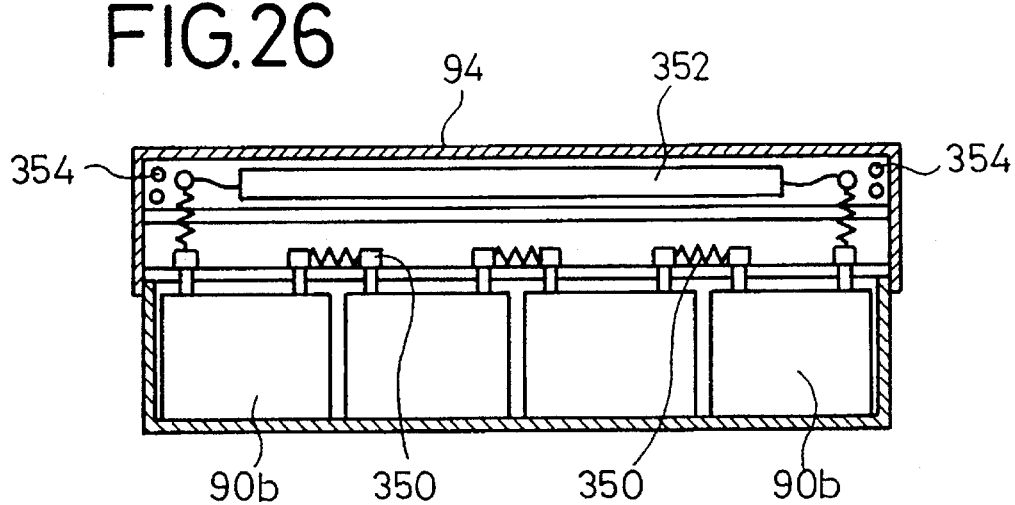
FIG. 26 is a transverse cross-sectional view showing the positions of the lid and the batteries shown in FIG. 25.

FIGS. 25 and 26 show an improved lid for the battery box according to the present invention. As shown in FIG. 26, a lid 94 is of a double-layer structure including a lower layer which houses connection wires 350 and an upper layer which houses a wiring unit 352. The lid 94 also has terminals 354 for connection to external circuits.

As shown in FIG. 25, two rows of batteries 90a, 90b are placed in the outer box 12, and then covered with the lid 94 which is placed over the outer box 12. The batteries 90a, 90b are now automatically electrically connected by the connection wires 350 in the lid 94.

Since the batteries 90a, 90b can automatically be electrically connected by the connection wires 350 simply by placing the lid 94 over the batteries 90a, 90b, the whole process of assembling the batteries 90a, 90b in the battery box is highly simplified. The lid 94 can be mass-produced inexpensively because it can be formed simply by bending a flat plate.

According to the present invention, as described above, the battery box for housing at least two rows of batteries therein has the center frame for extending between the rows of batteries, the center frame being effective in greatly reducing stresses and flexures of the bottom panel of the battery box. The added center frame also serves to increase the rigidity of and reduce the weight of the battery box, and to position and secure the batteries that are housed in the battery box.

The center frame which is of an inverted U-shaped cross section is of high mechanical strength and reduced weight. The mechanical strength of the center frame is also increased and the weight thereof is also reduced because it has a height that is substantially the same as the height of batteries to be housed in the battery box.

The battery box is composed of the outer box bent from a flat plate into a bottomed box shape, the inner frame pressed from a flat plate and held against and welded to inner surfaces of the front, rear, left, and right walls of the outer box, and the center frame disposed in the inner frame. The outer box can easily be formed to shape as it has a simple shape. The inner frame and the center frame added to the outer box are simple in shape. The battery box does not need a heavy, rugged reinforcing frame.

The thermally insulating members associated with the bottom panel of the outer box, the front, rear, left, and right walls of the inner frame, and the center frame are effective to keep the housed batteries warm and control the temperature thereof.

Furthermore, even if the batteries housed in the battery box have different heights, the batteries can be securely held in place in the battery box. While the electric vehicle in which the battery box is installed is running, the batteries in the battery box are prevented from being accidentally displaced, and hence from damage by collision with each other.

Since the battery box according to the present invention is of a highly simple structure, the cost of the battery box is not substantially increased.

Although certain preferred embodiments of the present invention has been shown and described in detail, it should be understood that various changes and modifications may be made therein without departing from the scope of the appended claims.

What is claimed is:

1. A battery box for housing at least two rows of batteries, comprising a center frame mounted in the battery box and disposed vertically between the two rows of batteries for holding the batteries in position, said center frame having a plurality of locking pins, holder means for holding the batteries, said holder means comprising central holding means for engaging said locking pins and holding adjacent inner ends of the batteries in the two rows, first end holding means for holding outer ends of the batteries in one of the two rows, and second end holding means for holding outer ends of the batteries in the other of the two rows.

2. A battery box according to claim 1, wherein said center frame comprises a hollow member having a substantially inverted U-shaped cross section.

3. A battery box according to claim 1, wherein said center frame has a height which is substantially the same as the height of the batteries.

4. A battery box according to claim 1, further comprising an outer box bent from a flat plate into a bottomed box shape, and an inner frame formed from a flat plate and having walls fixed to inner surfaces of front, rear, left, and right walls of the outer box, said center frame being disposed in said inner frame.

5. A battery box according to claim 4, further comprising thermally insulating members associated with a bottom panel of the outer box, with said front, rear, left, and right walls of the inner frame, and with the center frame.

6. A battery box according to claim 1, further comprising a first end frame and a second end frame which are disposed one on each side of said center frame, said first end frame and said second end frame having a first array of locking pins and a second array of locking pins, respectively, said first end holding means having means for engaging said first array of locking pins and holding the outer ends of the batteries in said one of the two rows, and said second end holding means having means for engaging said second array of locking pins and holding the outer ends of the batteries in said other of the two rows.

7. A battery box according to claim 1, wherein said locking pins are vertically disposed on said center frame, said central holding means comprising a holder bar having a plurality of holes for receiving said locking pins of the center frame, and a plurality of elastic members for being pressed against the adjacent inner ends of the batteries in the two rows.

8. A battery box according to claim 7, wherein said elastic members comprise respective rubber strips mounted on said holder bar.

9. A battery box according to claim 7, wherein said elastic members comprise a pair of legs of metal each having a plurality of slits defined therein at spaced intervals in a longitudinal direction thereof.

10. A battery box according to claim 1, wherein said locking pins are vertically disposed on said center frame, said central holding means comprising a pair of swing plates engaging said locking pins for holding the adjacent inner ends of the batteries in the two rows.

11. A battery box according to claim 10, wherein said central holding means comprising a central holder, said swing plates being swingably supported on said central holder by a hinge mechanism.

12. A battery box according to claim 11, wherein said central holder has a pair of tongues on respective opposite ends thereof for engaging the batteries to prevent the central holder from being turned when the central holder is fastened to the locking pins.

13. A battery box for housing at least two rows of batteries, comprising a center frame mounted in the battery box and disposed vertically between the two rows of batteries for holding the batteries in position, said center frame having a plurality of locking pins, a holder means for holding the batteries, said holder means including central holding means secured by said locking pins and holding adjacent inner ends of the batteries in the two rows.

14. A battery box according to claim 13, further comprising an outer box bent from a flat plate into a bottomed box shape, and said center frame being disposed in and welded to said outer box.

15. A battery box according to claim 13, wherein said locking pins are vertically disposed on said center frame, said central holding means comprising a holder bar having a plurality of holes for receiving said locking pins of the center frame and a plurality of elastic members for pressing against the adjacent inner ends of the batteries in the two rows.

16. A battery box according to claim 15, wherein said elastic members comprise respective rubber strips mounted on said holder bar.

17. A battery box according to claim 15, wherein said elastic members comprise a pair of legs of metal each having a plurality of slits defined therein at spaced intervals in a longitudinal direction thereof.

18. A battery box according to claim 13, wherein said locking pins are vertically disposed on said center frame, said central holding means comprising a pair of swing plates being secured by said locking pins for holding the adjacent inner ends of the batteries in the two rows.

19. A battery box according to claim 18, wherein said central holding means comprising a central holder, said swing plates being swingably supported on said central holder by a hinge mechanism.

* * * * *